O. F. ZAHN.
ROLLER BEARING.
APPLICATION FILED OCT. 7, 1907.

996,550.

Patented June 27, 1911.

Witnesses:

Inventor:
Oswald F. Zahn.

UNITED STATES PATENT OFFICE.

OSWALD F. ZAHN, OF LOS ANGELES, CALIFORNIA, ASSIGNOR TO ZAHN SELF RIGHTING ROLLER BEARING COMPANY, OF LOS ANGELES, CALIFORNIA, A CORPORATION OF CALIFORNIA.

ROLLER-BEARING.

996,550.

Specification of Letters Patent. Patented June 27, 1911.

Application filed October 7, 1907. Serial No. 396,279.

*To all whom it may concern:*

Be it known that I, OSWALD F. ZAHN, a citizen of the United States, residing at Los Angeles, in the county of Los Angeles and State of California, have invented a new and useful Roller-Bearing, of which the following is a specification.

This invention relates to roller bearings and is adapted to those bearings wherein the same rollers that take radial pressures also take end thrust or lateral pressures, and an object of the invention is to produce a bearing for this purpose, of simple and cheap construction and easy to assemble.

The invention also relates to bearings wherein means are provided for maintaining the position of the roller in the bearing, under end thrust or lateral pressures.

The invention further relates to such bearings wherein such means are at a single end of the rollers.

An object of the invention is to provide a roller bearing of this nature wherein the maximum number of rollers can be employed in a circular retaining way of given diameter without resorting to unmechanical and unsafe expedients, such as split or segmental members, rings, flanges, tracks or rollers; or notches for one of more of the parts, which destroy the smoothness of the rolling parts. By means of the present invention all such complications are avoided and the rollers and bearing members are made of simple construction and are easy to assemble, at the same time the rollers are enabled to be brought so close together as to be substantially in continuity, thereby providing for the maximum number of rollers in a given bearing.

The accompanying drawings illustrate the invention.

Figure 1:
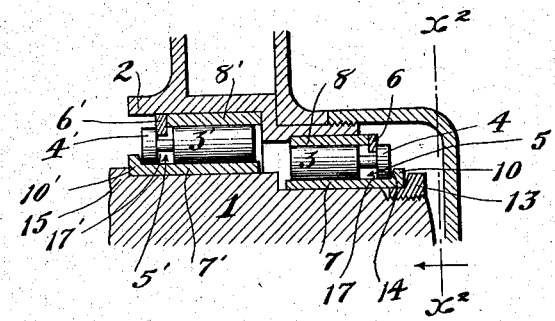
Figure 2:
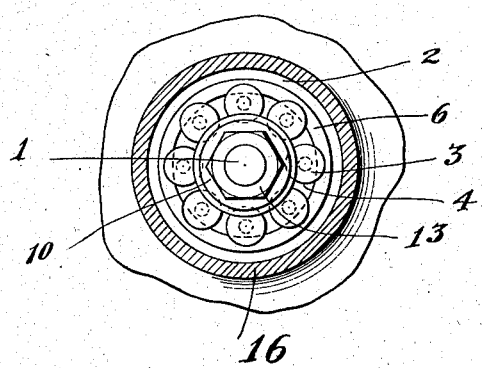

Figure 1 is a partial longitudinal section of the view embodying the invention. Fig. 2 is a transverse section thereof on the line $x^2$—$x^2$ Fig. 1.

The bearing comprises an inner member 1 and an outer member 2, either of which may be rotative, the other being fixed, but said members may be provided with sleeve bearing members to take the wear, two sleeves 7, 7' being provided on the inner bearing member and two sleeves 8, 8' on the outer bearing member. Two sets of bearing rollers 3, 3' are provided, one set at each end of the bearing. Said bearing rollers run between the two sleeves 7, 8 at one end of the bearing, say the outer end, and are grooved or recessed at 5 near one end to receive an abutment ring or member 6 which extends into said recesses and rests against the outer end of the outer bearing ring 8. The outer end of each of the rollers of this set is adapted to engage laterally with an abutment flange 10 formed on the inner bearing sleeve 7. At the other end of the bearing a set of rollers 3' runs between the inner and outer bearing sleeves 7', 8' and is provided near a single end thereof, namely, the end most remote from the other set of bearing rollers, with a recess or groove 5' to receive an abutment ring or member 6' which extends from the outer bearing member and rests against the end of the outer bearing sleeve 8'. The inner bearing sleeve 7' has an annular flange 10' engaging the end of bearing rollers 3' most remote from the bearing rollers 3. The above parts are all held in position by means of a nut 13 screwing on the inner bearing member 1 and engaging with the outer end of the bearing sleeve 7, the parts being confined between a shoulder 14 on this nut and a shoulder 15 on the inner bearing member, and the end pressures being transmitted longitudinally between the bearing members and rollers by means of the abutments and recesses thereof, as hereinafter set forth. A cap member 16 is provided for protection of the parts from dust.

All radial pressures are taken by the bearing rollers 3, 3', and all end thrusts or lateral pressures are also taken by said rollers. Thus if the inner bearing member 1 tends to move to the right relatively to the outer bearing member 2, the flange 10' on the sleeve 7' engages with the inner end 4' of roller 3'. The outer wall 17' of the groove 5' of said roller engages with the flange 6', the pressure thus being transmitted to the sleeve 8' and to the outer member 2. On the other hand, if the inner bearing member 1 tends to move to the left with respect to the outer bearing member 2, the flange 10 of the sleeve 7 on the inner bearing member engages with the outer ends 4 of the outer set of bearing rollers 3 and the pressure is transmitted from the outer shoulder or face 17 of the groove 5 in said bearing rollers to the ring 6 and through sleeve 8 to the outer member 2. Thus one or the other set of rollers comes into action to resist end thrust according to the direction of the thrust. It will be noticed that the rollers are of uniform diameter from end to end so that the points of end thrust contact with rolling friction on members 7, 7'.

With the above-described construction a condition of end thrust in the bearing does not materially displace the rollers notwithstanding that the rollers are loosely assembled.

I do not confine my invention to this particular arrangement as the parts may be changed and still gain the object of the invention.

What I claim is:—

1. In a roller bearing comprising inner and outer bearing members, a set of bearing rollers at each end of the bearing, each set forming a circular series of rollers in close juxtaposition, each roller having a groove near that end which is most remote from the other set of rollers, abutment means at each end of the bearing on one bearing member engaging with the end of the rollers which are most remote from the other set of rollers, and an abutment means on the other bearing member extending into the recesses of the rollers and engaging with the walls in said recesses which are most remote from the other set of rollers.

2. A roller bearing comprising inner and outer bearing members and rollers having a groove near a single end and having a uniform diameter from end to end except for said groove, one of said bearing members having an abutment to laterally engage in said groove, and the other of said bearing members having an abutment to laterally engage on the end of said rollers adjacent to said groove.

3. In a roller bearing comprising inner and outer bearing members, a set of bearing rollers at each end of the bearing each roller having an end shoulder and a groove adjacent thereto to form another shoulder, whereby two shoulders are formed at a single end of each roller, and two abutment means on each bearing member engaging laterally with said shoulder.

In testimony whereof, I have hereunto set my hand at Los Angeles, California, this 1st day of October 1907.

OSWALD F. ZAHN.

In presence of—
ARTHUR P. KNIGHT,
LOUIS W. GRATZ.